May 30, 1967 W. J. MARTIN ETAL 3,322,365

COAXIAL REEL MOUNT

Filed June 7, 1965

2 Sheets-Sheet 1

WILLIAM J. MARTIN and
LEONARD T. HARRIS
INVENTORS

BY Robert G. Clay
ATTORNEY

WILLIAM J. MARTIN and
LEONARD T. HARRIS
INVENTORS

BY Robert G. Clay
ATTORNEY

United States Patent Office 3,322,365
Patented May 30, 1967

3,322,365
COAXIAL REEL MOUNT
William J. Martin, Sunnyvale, and Leonard T. Harris, Redwood City, Calif., assignors to Ampex Corporation, Redwood City, Calif., a corporation of California
Filed June 7, 1965, Ser. No. 461,850
13 Claims. (Cl. 242—68.3)

This invention relates to tape transports and particularly to apparatus for mounting a pair of tape storage reels in coaxial alignment for separate rotation.

When it is desired to mount a pair of reels coaxially for separate rotation, as on separate shafts, a problem arises in that the reel arbor that is closest to the tape deck or chassis of the transport is to some degree masked or shadowed from the operator by the arbor that is farthest from the tape deck and closest to the operator. Thus, it is difficult to operate the reel-securing device of the first arbor. A further problem is that the turntable for the second reel must be arranged so as to permit the first reel to be slipped over and beyond the second arbor and turntable in order to arrive at the first arbor.

Accordingly, it is an object of the present invention to provide means for mounting a pair of reels in coaxial alignment for separate rotation.

It is a further object of the present invention to provide mounting means as above described and operable by hand with ease and convenience.

In accordance with the invention a pair of arbors are provided on coaxial, separately rotatable shafts extending from a tape deck. The first arbor, closest to the tape deck, has a turntable and keying lug. The second arbor has a number of radially projecting ears on the side thereof closest to the tape deck. The first reel has a number of keyways and is slipped over the second arbor with the keyways passing the ears of the second arbor and engaging the keying lug of the first arbor. A detent means on the second arbor is hand operable to key the second arbor to the reel securing means of the first arbor and operate the same. The second reel is then placed on the second arbor with the keyways of the second reel not aligned with the ears of the second arbor. Means are provided for automatically disengaging the detent means linking the two arbors when the second reel is mounted. Retractable detent means are also provided on the second arbor for keying the second reel thereto with the ears of the second arbor acting as the turntable for the second reel. The reel-securing means of the second arbor is then operated. A reverse procedure is followed to remove the reels.

Figure 1:
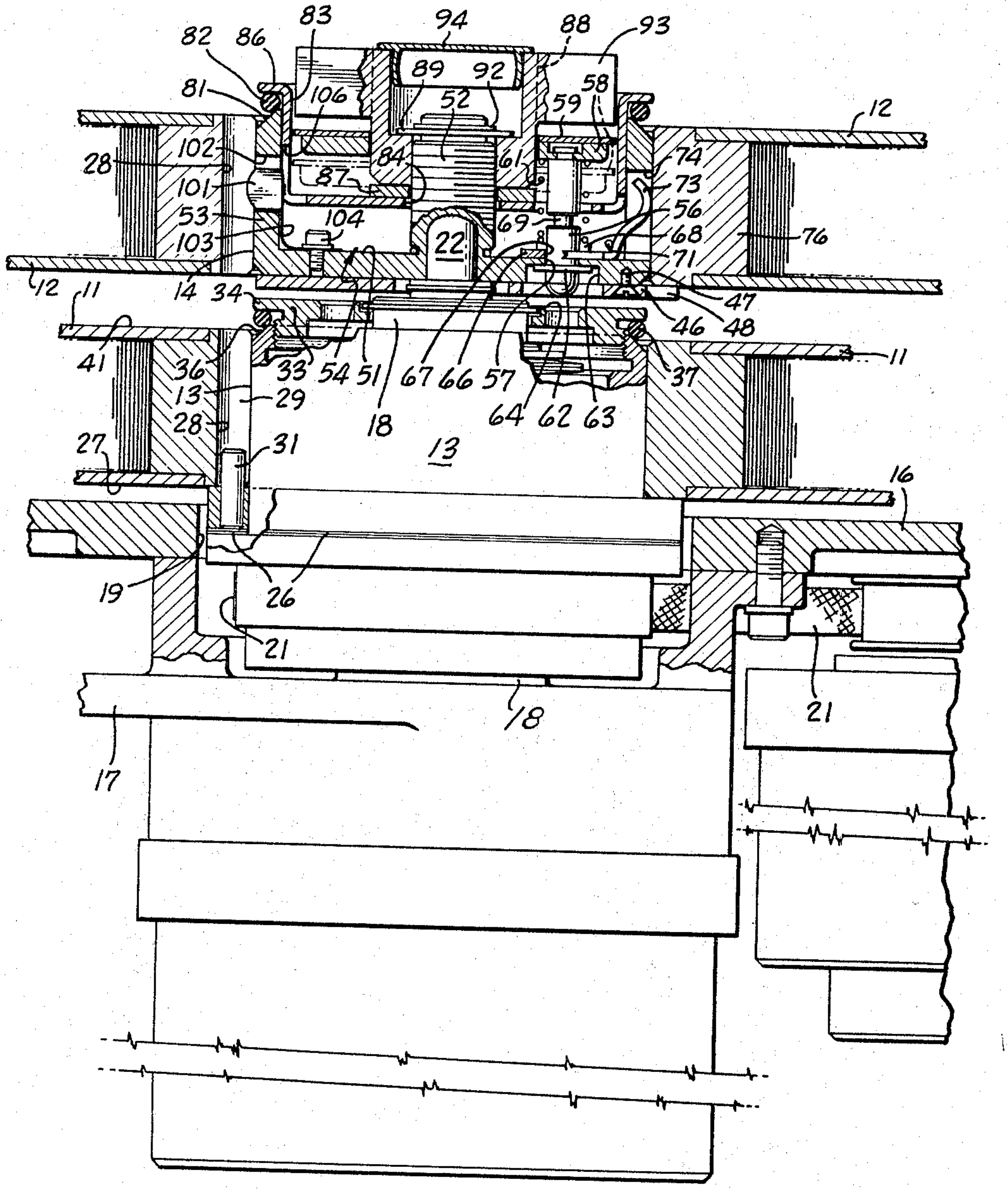
Figure 2:
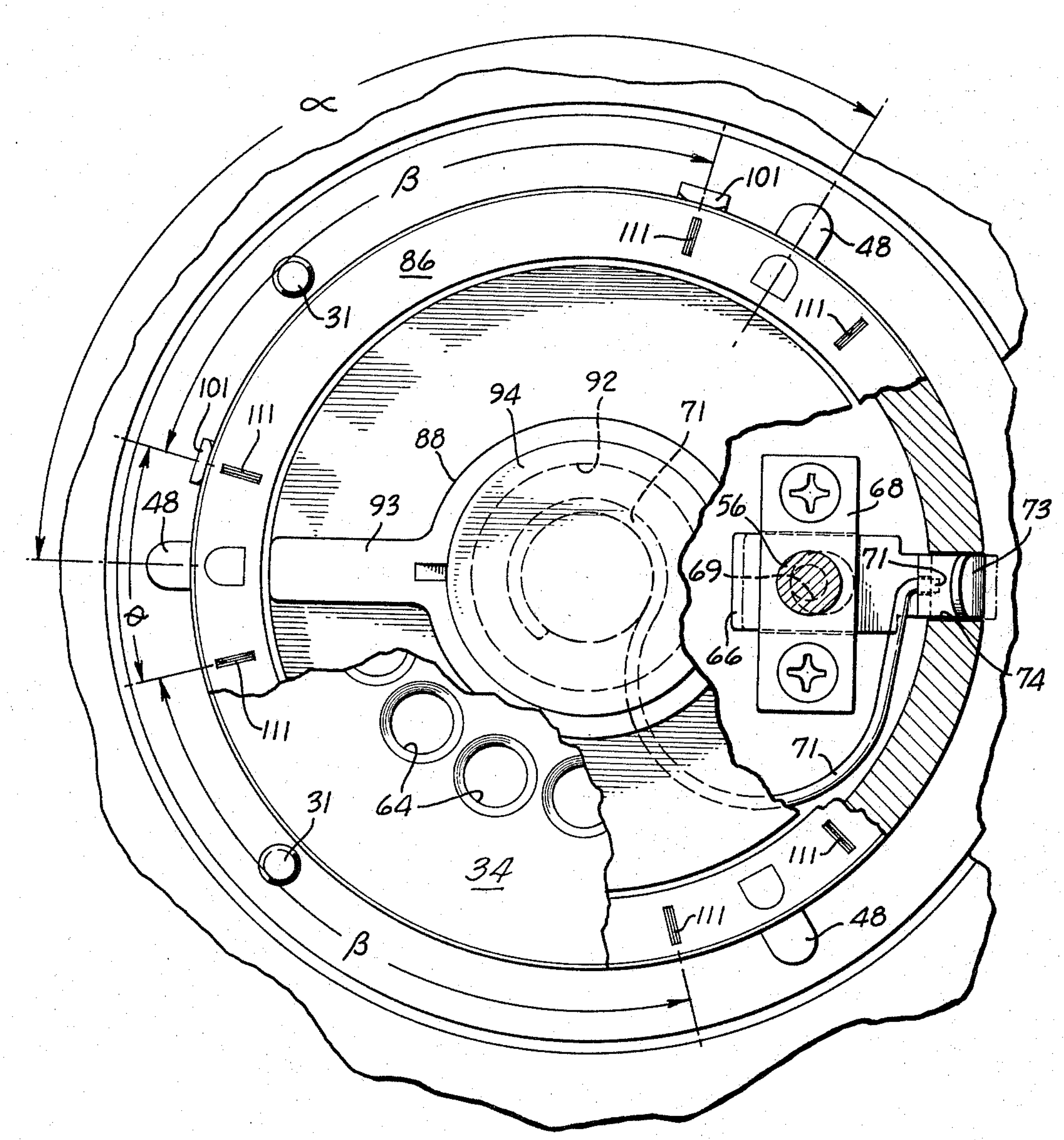

A better understanding of the invention may be had by reference to the following description, taken in conjunction with the accompanying drawings, in which:

FIGURE 1 is an elevation, partly in section, showing the structure of the invention; and FIGURE 2 is an enlarged broken-away plan view.

Referring now to the drawings and particularly to FIGURE 1, there is shown a pair of first and second reels 11, 12 mounted respectively on a pair of first and second arbors 13 and 14, which are in turn mounted for separate coaxial rotation, as follows: a tape deck or mounting plate 16 has a recessed extension plate 17 forming an integral unit therewith, and the plate 17 has an upstanding hollow cylindrical boss 18, extending through an opening 19 in the tape deck 16. The arbor 13 is journalled for free rotation on the boss 18 and is driven by a belt 21 and a motor (not shown) beneath the tape deck 16. The arbor 13 thus constitutes an outer rotatable shaft. The arbor 14 is press-fitted on a shaft 22 that in turn is journalled for free rotation within the boss 18 and extends through an appropriate opening in the plate 17 for coupling to another drive motor (not shown). The shaft 22 thus constitutes an inner shaft concentric with the arbor 13 and separately rotatable, the shaft 22 having a portion extending beyond the arbor 13 for mounting the reel 12. The above described structure is the basic structure to which the invention is applied, and it will be clear that the invention may also be applied to any similar or analogous structures whereby the reels 11 and 12 are mounted for coaxial separate rotation.

The structure by which the first reel 11 is secured to the first arbor 13 is described as follows: the arbor 13 has a radially extending flange 26 which serves as a turntable for the reel 11 and functions to engage the lower flat side 27 of the reel to position the reel in a predetermined position axially on the arbor 13. The reel 11 has three circumferentially equally-spaced keyways 28 formed in the central opening 29 thereof, and at least one of the keyways 28 is engaged by a keying lug 31 that extends from the flange 26 of the arbor, so that the reel is keyed for rotation with the arbor. To secure the reel axially on the arbor and tightly on the flange 26, a clamping knob 33 is threaded into an opening in the upper end of the arbor 13. Knob 33 has a radially extending flange 34 confronting a bevelled surface 36 on the upper end of the arbor 13, and a resilient elastic ring member 37 is mounted between the flange 34 and the surface 36. Thus if the knob 33 is screwed downwardly with respect to the arbor 13, the elastic ring member 37 is expanded radially outwardly to obtrude beyond the circumferential envelope of the arbor and engage the upper surface 41 of the reel, locking the reel on the arbor and compressing it tightly against the flange 26.

It will be seen that the second arbor 14 has the same circumferential envelope as the first arbor 13 so that the first reel may be easily slipped over the second hub 14 for mounting or removing the reel from the first arbor 13. However, the second arbor 14 must have structure performing a function similar to that of the flange 26 for positioning the second reel 12 thereon, and this structure must at the same time permit the free passage of the first reel 11 over and beyond the second arbor 14 during the mounting and removal of the first reel. Accordingly, the second arbor 14 is provided with a plate 46 fitted on the lower end thereof, and secured thereto by means of fasteners 47. The plate 46 generally conforms to and in fact has a slightly smaller diameter than the envelope of the arbor, but has three circumferentially equi-spaced extensions or ears 48 that serve to position the second reel 12 axially on the arbor 14, and that also conform to the keyways 28 of the first reel 11 so as to permit the sliding of the first reel beyond the plate 46 and onto the first arbor 13. Of course it is important in mounting the second reel 12 to ensure that the keyways 28 thereof are not aligned with the extensions 48 of the plate 46, but the structure by which correct alignment is achieved will be better described and understood after further description of the arrangement of the second arbor 14, as follows:

The second arbor 14 is provided with means for operating the reel securing knob 33 of the first arbor after the mounting of the first reel 11 and before the mounting of the second reel 12. The body of the second arbor 14 is formed as a hollow cup-like member having an end wall 51 from which extends in an axial direction a central mounting portion 52 by which the arbor is mounted on the shaft 22, and a circumferential arbor wall 53, defining an annular recess 54 in the second arbor 14. A trio of circumferentially equi-spaced detent pins 56 are mounted within recess 54 and extending through appropriate openings 57 in the wall 51 for axial sliding motion toward and away from the knob 34 of the first arbor 13. The three detent pins 56 are secured as by riveting to an annular plate 58 that also fits within the recess 54, and a cover plate 59 is secured as by cementing to the upper side of the plate 58. Three helical compression springs 61 are mounted on the pins 56 so as to load the pins and plate 58 axially upwardly and toward a retracted position of the pins. Each pin has a snap-ring 62 fitted on a conforming recess thereof beneath the wall 51 to act as a stop and to limit the retracting motion of the pins and plate 58. The wall 51 may have cut-away portions 63 for receiving the snap-rings 62. The knob 34 of the first arbor 13 has at least three recesses 64 in the upper end thereof for receiving the detent pins 56 when they are moved downwardly as by pressing the plates 58 and 59 downwardly with the fingers.

As shown in FIGURE 2, there are actually fifteen (a multiple of three) recesses 64, to provide coupling action with the maximum convenience. The pins 56 are retained in their downward extended position by means of a detent plate 66 having an opening 67 fitted around one of the pins 56, the plate 66 being arranged for radial sliding motion in a guide bracket 68 that is secured to the wall 51. The corresponding pin 56 has a circumferential groove 69 that is aligned with the detent plate 66 when the pins are in their extended position. The detent plate 66 is urged as by a spring 71 in an axially outward direction so it slips into the groove 69 of the pin upon extension of the pin. Thus it will be clear that when the plates 58–59 are pressed downwardly by the fingers of the operator, and the arbor 14 is appropriately rotated to align the pins with the recesses 64 of the first arbor, the pins 56 lock the first and second arbors together in such a manner that the second arbor 14 may then be rotated bodily by the operator to tighten down the knob 33 of the first arbor and firmly secure the first reel 11 thereto.

The detent plate 66 is automatically released and the pins 56 are automatically retracted when the second reel 12 is fitted on the second arbor by the operator. The detent plate 66 is provided with an extension portion 73 that extends radially through an appropriate opening 74 in the outer circumferential wall of the second arbor so as to be obtruded into the path of the second reel when the pins 56 are in their extended position. The extension portion 73 of the detent plate 66 has a circumferential dimension greater than that of any of the keyways 28 of the reels, and a cam surface that is then engaged by the lower surface 76 of the second reel 12 so that the detent plate 66 is forced radially inwardly by the reel against the urging of the spring 71, releasing the corresponding pin 56. The pin springs 61 then return the pins and plates 58, 59 to the retracted position.

The second arbor 14 has an arrangement somewhat similar to that of the first arbor for locking the second reel axially thereon. The circumferential wall 53 of the second arbor has an upper beveled surface 81 upon which is mounted a resilient elastic ring member 82, which may be expanded on the surface 81 for securing the second reel. An annular cup-like member 83 is positioned within the recess 54 of the second arbor, the member 83 having a central opening 84 fitting loosely around the portion 52 of the arbor, and an upper circumferential flange 86 overlying the ring member 82 for compressing the ring member downwardly and outwardly. An annular washer 87, made for example of antifriction material such as Teflon is superimposed on the member 83 in the vicinity of the portion 52 of the arbor. A hand-operable compressing member 88 is threaded onto the portion 52 of the arbor, and is retained thereon by means of a washer 89 and slip ring 91. The member 88 has a central well 92 for receiving the washer 89, and a pair of wing extensions 93 for grasping by the operator's fingers for turning the member 88. The member 88 extends as will be seen through the central opening of the annular plates 58, 59. A snap cover 94 made for example of plastic material is fitted into the upper end of the well 92 for the sake of neatness and protection. It will be seen that when the member 88 is rotated with respect to the arbor 14, the lower end thereof bears against the washer 87 and urges the member 83 downwardly, expanding the ring member 82 and locking the second reel 12 upon the second arbor 14.

To secure the second reel 12 for rotation with the second arbor 14, at least two detent keying members 101 are provided for extension from the second arbor into the keyways 28 of the second reel 12. Each of the members 101 is formed as a lug extending through an appropriate opening 102 in the outer circumferential wall 53 of the second arbor. Each member 101 is mounted on a leaf spring 103, and has a rounded outer surface so that when the first reel 11 is slipped over the second arbor, the members 101 retract to permit the passage of the first reel. Each leaf spring 103 is secured by a fastener 104 to the second arbor, and the internally extending portions of the spring and member 101 extend into recesses 106 in the member 83 so as to key the member 83 at all times against rotation with respect to the arbor. When the second reel 12 is fitted onto the second arbor 14 the keyways 28 thereof will ordinarily not be aligned with either of the keying members 101, for reasons later to be described. Consequently upon the initial placing of the reel on the arbor the members 101 both retract. However, subsequently, upon initial rotation of the reel with respect to the arbor, as at the beginning of play when the arbor is rotated by its motor, one of the keyways 28 is automatically brought into alignment with one of the members 101. The spring 103 thereof causes this member to snap radially outwardly to engage the keyway, and the reel is thereafter keyed for rotation with the arbor.

The manner in which the second reel 12 is placed on the second arbor with the keyways 28 thereof out of alignment with the ears 48, so that the reel is retained axially on the arbor, is illustrated in FIGURE 2. As shown in the figure, there are three ears 48 equally spaced at an angle $\alpha=120°$ apart, and two key members 101 spaced at an angle $\beta$ substantially less than 120° apart and both positioned between an adjacent pair of ears 48. The upper surface of the flange 86 facing the operator bears a number of index marks 111, two adjacent ones of which are placed at the same circumferential positions as the key members 101, and are consequently spaced at the same angle $\beta$ apart. The other marks 111 are also grouped in pairs spaced apart at the angle $\beta$ and located in the sectors between corresponding adjacent pairs of ears 48. The angle $\beta$, while substantially smaller than the angle $\alpha$, is nevertheless substantially larger than the angular spacing $\theta$ between any pair of index marks 111 that lie on opposite sides of one of the ears 48. Thus it is only necessary for the operator to place the second reel 14 on the arbor with one of the keyways 28 between a pair of marks 111 that are spaced at the greater angle $\beta$. Such action ensures that the keyways are not aligned with the ears 48 and that one of the keyways will lie in the angle $\beta$, so that it will encounter one or the other of the keys 101 on rotation with respect to the arbor, before it encounters one of the ears 48. The arrangement described in which the marks 111, between which the keyway is to be placed, are spaced at the greater angle $\beta$, enables the operator to perform this operation without making a mistake, i.e., without placing the keyways in the angle $\theta$ and aligned with the ears 48. The presence of the marks 111 also assist the operator in placing the first reel 11 on the arbor with the keyways 28 thereof in the respective angle $\theta$ and aligned with the ears 48 so as to slip the reel beyond the second arbor 14 and onto the first arbor 13.

When the reels are to be removed, the wing extensions 93 are first rotated to permit contraction of the upper ring member 82, and the second reel 12 is then removed. The plates 59 and 58 are then pressed with the fingers, so that the pins 56 engage the knob 34 of the first arbor 13, and the entire second arbor 14 is then rotated as by grasping the peripheral surface of the wall 53 thereof with the fingers, to unscrew the knob 34 and permit contraction of the lower ring member 37. The peripheral surface of the wall 53 may be knurled to assist in this operation. The rotation of the second knob 14 is brought to a stop with the ears 48 aligned with the keyways 28 of the first reel 11, and the first reel is then removed. The passage of the first reel 11 over the second arbor 14 trips the extended portion 73 of the detent plate 66, and the pins 56 are returned by their springs to retracted position.

Thus there has been described a pair of arbors which are provided on coaxial, separately rotatable shafts extending from a tape deck. The first arbor, closest to the tape deck, has a turntable and keying lug. The second arbor has a number of radially projecting ears on the side thereof closest to the tape deck. The first reel has a number of keyways and is slipped over the second arbor with the keyways passing the ears of the second arbor and engaging the keying lug of the first arbor. A detent means on the second arbor is hand operable to key the second arbor to the reel securing means of the first arbor and operate the same. The second reel is then placed on the second arbor with the keyways of the second reel not aligned with the ears of the second arbor. Means are provided for automatically disengaging the detent means linking the two arbors when the second reel is mounted. Retractable detent means are also provided on the second arbor for keying the second reel thereto with the ears of the second arbor acting as the turntable for the second reel. The reel-securing means of the second arbor is then operated. A reverse procedure is followed to remove the reels.

What is claimed is:

1. Apparatus for mounting a pair of reels on a pair of independently rotatable concentric inner and outer shafts, the inner shaft having a portion extendinging axially beyond the outer shaft, comprising:
   first means on the outer shaft for mounting and securing a first of the reels thereon; and
   second means for mounting and securing the second of the reels on the extending portion of the inner shaft;
   said second means including third means operable to operate said first means to secure the first reel on said outer shaft.

2. Apparatus for mounting reels on a pair of coaxial arbors, comprising:
   first means mounted on a first of said arbors for securing a first of said reels thereto;
   second means mounted on the second of said arbors for axial movement with respect thereto and for engaging and operating said first means; and
   third means mounted on the second of said arbors for securing a second of said reels thereto.

3. Apparatus for mounting reels on a pair of separately journalled coaxial arbors, comprising:
   first means mounted on a first of said arbors and including a rotating operating member for securing a first of said reels thereto;
   a detent member mounted on the second of said arbors for axial extension into a conforming recess in said rotating operating member, and for thereby operating said first means upon rotation of said second arbor; and
   third means mounted on the second of said arbors for securing a second of said reels thereto.

4. Apparatus for mounting reels on a pair of separately journalled coaxial arbors, comprising:
   first means mounted on a first of said arbors and including a rotating operating member for securing a first of said reels thereto;
   a first detent member mounted on the second of said arbors for axial extension into a conforming recess in said rotating operating member, and for thereby operating said first means upon rotation of said second arbor, said first detent member being spring loaded for retraction;
   a second detent member mounted on said second arbor for movement with respect thereto and for extension into a conforming recess in said first detent member in the extended position of said first detent member; and
   third means mounted on the second of said arbors for securing a second of said reels thereto.

5. Apparatus for mounting reels on a pair of separately journalled coaxial arbors, comprising:
   first means mounted on a first of said arbors and including a rotating operating member for securing a first of said reels thereto;
   a first detent member mounted on the second of said arbors for axial extension into a conforming recess in said rotating operating member, and for thereby operating said first means upon rotation of said second arbor, said first detent member being spring loaded for retraction;
   a second detent member mounted on said second arbor for movement with respect thereto and for extension into a conforming recess in said first detent member in the extended position of said first detent member, said second detent member being spring loaded for said extension thereof and having a portion engaged by a second of said reels on said second arbor for retracting said second detent member; and
   third means mounted on the second of said arbors for securing said second reel thereto.

6. Apparatus for mounting reels on a pair of separately journalled coaxial arbors, comprising:
   first means mounted on a first of said arbors and including a rotating operating member for securing a first of said reels thereto;
   a first detent member mounted on the second of said arbors for axial extension into a conforming recess in said rotating operating member, and for thereby operating said first means upon rotation of said second arbor, said first detent member being spring loaded for retraction;
   a second detent member mounted on said second arbor for movement with respect thereto and for extension into a conforming recess in said first detent member in the extended position of said first detent member, said second detent member being spring loaded for said extension thereof and having an extension portion engaged by a second of said reels on said second arbor for retracting said second detent member; and
   third means mounted on the second of said arbors for securing said second reel thereto; said third means including a radial extension for engaging one side of said second reel and supporting same on said second arbor, with said extension being shaped to clear a first conforming axial keyway groove in the inner periphery of said first reel, and a third detent member spring loaded for extension from the outer periphery of said second arbor to engage a second conforming axial keyway groove in said second reel, said first and second grooves being identical, and said third detent member being retractable to a position within said second arbor.

7. Apparatus as described in claim 6 wherein said extension portion of said second detent member has a circumferential dimension greater than that of said axial keyway grooves of said reels.

8. Apparatus as described in claim 6 wherein there are:
a plurality of said radial extensions circumferentially equispaced on said second arbor;
a corresponding plurality of said grooves circumferentially equispaced in each of said reels;
a pair of said third detent members circumferentially spaced at an angle slightly less than the spacing angle of said extensions and located between an adjacent pair of said extensions; and
a corresponding plurality of pairs of index marks on said second arbor, each pair being located between an adjacent pair of said extensions and spaced at the same angle as said pair of third detent members.

9. Apparatus for mounting reels on a pair of separately journalled coaxial arbors, comprising:
first means mounted on a first of said arbors and including a rotating operating member for securing a first of said reels thereto, said operating member having a screw thread engaging a mating thread on said first arbor for axial translation of said operating member with respect to said first arbor on relative rotation thereof, and a first resilient ring member disposed between axially confronting surfaces of said first arbor and operating member for expansion thereby to obtrude radially beyond the inner periphery of said first reel for securing same;
a first detent member mounted on the second of said arbors for axial extension into a conforming recess in said rotating operating member, and for thereby operating said first means upon rotation of said second arbor, said first detent member being spring loaded for retraction;
a second detent member mounted on said second arbor for movement with respect thereto and for extension into a conforming recess in said first detent member in the extended position of said first detent member, said second detent member being spring loaded for said extension thereof and having a portion engaged by a second of said reels on said second arbor for retracting said second detent member; and
third means mounted on the second of said arbors for securing said second reel thereto; said third means including a radial extension for engaging one side of said second reel and supporting same on said second arbor, with said extension being shaped to clear a first conforming axial groove in the inner periphery of said first reel, and a third detent member spring loaded for extension from the outer periphery of said second arbor to engage a second conforming axial groove in said second reel, said first and second grooves being identical, and said third detent member being retractable to a position within said second arbor.

10. Apparatus for mounting reels on a pair of separately journalled coaxial arbors, comprising:
first means mounted on a first of said arbors and including a rotating operating member for securing a first of said reels thereto, said operating member having a screw thread engaging a mating thread on said first arbor for axial translation of said operating member with respect to said first arbor on relative rotation thereof, and a first resilient ring member disposed between axially confronting surfaces of said first arbor and operating member for expansion thereby to obtrude radially beyond the inner periphery of said first reel for securing same;
said first means also including a flange extending radially from said first arbor for supporting said first reel and clamping same between said flange and said first resilient ring member, and a key member extending from said flange for securing said first reel against rotation with respect to said first arbor;
a first detent member mounted on the second of said arbors for axial extension into a conforming recess in said rotating operating member, and for thereby operating said first means upon rotation of said second arbor, said first detent member being spring loaded for retraction;
a second detent member mounted on said second arbor for movement with respect thereto and for extension into a conforming recess in said first detent member in the extended position of said first detent member, said second detent member being spring loaded for said extension thereof and having a portion engaged by a second of said reels on said second arbor for retracting said second detent member; and
third means mounted on the second of said arbors for securing said second reel thereto; said third means including a radial extension for engaging one side of said second reel and supporting same on said second arbor, with said extension being shaped to clear a first conforming axial groove in the inner periphery of said first reel, and a third detent member spring loaded for extension from the outer periphery of said second arbor to engage a second conforming axial groove in said second reel, said first and second grooves being identical, and said third detent member being retractable to a position within said second arbor.

11. Apparatus for mounting reels on a pair of separately journalled coaxial arbors, comprising:
first means mounted on a first of said arbors and including a rotating operating member for securing a first of said reels thereto said operating member having a screw thread engaging a mating thread on said first arbor for axial translation of said operating member with respect to said first arbor on rotation thereof, and a resilient ring member disposed between axially confronting surfaces of said first arbor and operating member for expansion thereby to obtrude radially beyond the inner periphery of said first reel for securing same;
the second of said arbors having an end wall from which extends axially a central mounting portion of a circumferential arbor wall defining an annular recess in said second arbor;
an annular plate fitted within said annular recess of said second arbor;
a trio of first detent members mounted in circumferentially equispaced relation on said annular plate and extending axially through conforming openings in said end wall for axial extension into conforming recesses in said rotating operating member, and for thereby operating said first means upon rotation of said second arbor, said annular plate and said first detent members being spring loaded for retraction;
a second detent member mounted on said second arbor for movement with respect thereto and for extension into a conforming recess in one of said first detent members in the extended position of said one first detent member, said second detent member being spring loaded for said extension thereof and having a portion engaged by a second of said reels on said second arbor for retracting said second detent member; and
third means mounted on the second of said arbors for securing said second reel thereto; said third means including a radial extension for engaging one side of said second reel and supporting same on said second arbor, with said extension being shaped to clear a first conforming axial groove in the inner periphery of said first reel, and a third detent member spring loaded for extension from the outer periphery of said second arbor to engage a second conforming axial groove in said second reel, said first and second grooves being identical, and said third detent member being retractable to a position within said second arbor.

12. Apparatus for mounting reels on a pair of separately journalled coaxial arbors comprising:

first means mounted on a first of said arbors and including a rotating operating member for securing a first of said reels thereto said operating member having a screw thread engaging a mating thread on said first arbor for axial translation of said operating member with respect to said first arbor on rotation thereof, and a first resilient ring member disposed between axially confronting surfaces of said first arbor and operating member for expansion thereby to obtrude radially beyond the inner periphery of said first reel for securing same;

the second of said arbors having an end wall from which extends axially a central mounting portion and a circumferential arbor wall defining an annular recess in said second arbor;

an annular plate fitted within said annular recess of said second arbor;

a trio of first detent members mounted in circumferentially equispaced relation on said annular plate and extending axially through conforming openings in said end wall for axial extension into conforming recesses in said rotating operating member, and for thereby operating said first means upon rotation of said second arbor, said annular plate and said first detent members being spring loaded for retraction;

a second detent member mounted on said second arbor for movement with respect thereto and for extension into a conforming recess in one of said first detent members in the extended position of said one first detent member, said second detent member being spring loaded for said extension thereof and having a portion engaged by a second of said reels on said second arbor for retracting said second detent member; and third means mounted on the second arbor for securing said second reel thereto; said third means including a radial extension for engaging one side of said second reel and supporting same on said second arbor, with said extension being shaped to clear a first conforming axial groove in the inner periphery of said first reel, and a third detent member spring loaded for extension from the outer periphery of said second arbor to engage a second conforming axial groove in said second reel, said first and second grooves being identical, and said third detent member being retractable to a position within said second arbor;

said third means also including a cup-shaped member having an end wall with a central opening fitting around said second arbor central mounting portion and between said annular plate and second arbor end wall, a cylindrical side wall extending between said annular plate and said second arbor circumferential wall, and a peripheral flange extending radially to confront the free end of said second arbor circumferential wall, a securing member threaded on said second arbor central mounting portion and extending through the central opening of said annular plate to bear against said cup-shaped member end wall, and a second resilient ring member disposed between confronting surfaces of said second arbor circumferential wall and said peripheral flange of said cup-shaped member for expansion thereby to obtrude radially beyond the inner periphery of said second reel for securing same.

13. Apparatus for mounting reels on a pair of separately journalled coaxial arbors, comprising:

first means mounted on a first of said arbors and including a rotating operating member for securing a first of said reels thereto, said operating member having a screw thread engaging a mating thread on said first arbor for axial translation of said operating member with respect to said first arbor on relative rotation thereof, and a first resilient ring member disposed between axially confronting surfaces of said first arbor and operating member for expansion thereby to obtrude radially beyond the inner periphery of said first reel for securing same;

said first means also including a flange extending radially from said first arbor for supporting said first reel and clamping same between said flange and said first resilient ring member, and a key member extending from said flange for securing said first reel against rotation with respect to said first arbor;

the second of said arbors having an end wall from which extends axially a central mounting portion and a circumferential arbor wall defining an annular recess in said second arbor;

an annular plate fitted within said annular recess of said second arbor;

a trio of first detent members mounted in circumferentially equispaced relation on said annular plate and extending axially through conforming openings in said end wall for axial extension into conforming recesses in said rotating operating member, and for thereby operating said first means upon rotation of said second arbor, said annular plate and said first detent members being spring loaded for retraction;

a second detent member mounted on said second arbor for movement with respect thereto and for extension into a conforming recess in one of said first detent members in the extended position of said one first detent member, said second detent member being spring loaded for said extension thereof and having an extension portion engaged by a second of said reels on said second arbor for retracting said second detent member; and third means mounted on said second arbor for securing said second reel thereto; said third means including a plurality of radial extensions circumferentially equispaced on said second arbor for engaging one side of said second reel and supporting same on said second arbor, with said extensions being shaped to clear a corresponding plurality of first conforming axial keyway grooves in the inner periphery of said first reel, and a pair of third detent members circumferentially spaced at an angle slightly less than the spacing angle of said extensions and located between an adjacent pair of said extensions, said third detent members being spring loaded for extension from the outer periphery of said second arbor to engage a corresponding plurality of second conforming axial keyway grooves in said second reel, said first and second keyway grooves being identical, and said third detent members being retractable to a position within said second arbor;

a corresponding plurality of pairs of index marks on said second arbor, each pair being located between an adjacent pair of said extensions and spaced at the same angle as said pair of third detent members;

said third means also including a cup-shaped member having an end wall with a central opening fitting around said second arbor central mounting portion and between said annular plate and second arbor end wall, a cylindrical side wall extending between said annular plate and said second arbor circumferential wall, and a peripheral flange extending radially to confront the free end of said second arbor circumferential wall, a securing member threaded on said second arbor central mounting portion and extending through the central opening of said annular plate to bear against said cup-shaped member end wall, and a second resilient ring member disposed between confronting surfaces of said second arbor circumferential wall and said peripheral flange of said cup-shaped member for expansion thereby to obtrude radially beyond the inner periphery of said second reel for securing same; said extension portion of said second detent member having a circumferential dimension greater than that of said axial keyway grooves of said reels.

References Cited

UNITED STATES PATENTS 1,713,277 5/1929 Goldberg et al. ------- 242—68
2,213,777 9/1940 Wittel -------------- 242—68

FRANK J. COHEN, *Primary Examiner.*

N. L. MINTZ, *Assistant Examiner.*